United States Patent [19]

McMillan

[11] Patent Number: 5,020,577
[45] Date of Patent: Jun. 4, 1991

[54] APPARATUS AND METHOD FOR REPAIRING VEHICLE HEATER CORES

[76] Inventor: Mark B. McMillan, 1143 East Vine Street, Salt Lake City, Utah 84121

[21] Appl. No.: 398,588

[22] Filed: Aug. 25, 1989

[51] Int. Cl.$^5$ ............................ B08B 3/00; B08B 9/00
[52] U.S. Cl. ...................................... 141/98; 141/92; 134/169 A; 285/177
[58] Field of Search ............... 141/98, 1, 89, 92; 134/169 A, 169 R, 171; 29/402.18; 165/95; 285/177

[56] References Cited

U.S. PATENT DOCUMENTS

| | | | |
|---|---|---|---|
| 2,222,516 | 11/1940 | Powell et al. | 134/169 A |
| 2,768,844 | 10/1956 | Schadeberg | 285/177 |
| 3,094,131 | 6/1963 | Williams | 134/169 A |
| 3,115,145 | 12/1963 | Monteath Jr. | 134/169 A |
| 4,213,474 | 7/1980 | Harrison | 134/169 A |
| 4,378,034 | 3/1983 | Albertson | 141/1 |
| 4,614,226 | 9/1986 | Ryan | 134/169 A |
| 4,779,904 | 10/1988 | Rich | 285/177 |
| 4,793,386 | 12/1988 | Sloan | 141/65 |

Primary Examiner—Henry J. Recla
Assistant Examiner—Keith Kupferschmid
Attorney, Agent, or Firm—Thorpe, North & Western

[57] ABSTRACT

An apparatus and method for repairing a leak in a vehicle heater core without requiring its removal from its vehicle mounted position. The apparatus comprises an airtight container having an immersible pump and heater element secured within the container and including inlet and outlet fluid lines for coupling with hose extensions from the heater core of a vehicle. Access to such hose lines may be accomplished by an intermediate cut on each of the inlet and outlet hoses to the heater core, joining the respective flowlines of the container into a closed fluid circuit. In this configuration, flushing solution, cleaning solution and sealing compound can be pumped through the heater core to repair any existing leaks. An inlet valve is provided for introducing air pressure to assist in delivery of the sealer compound through the closed circuit and confirming repair of any existing leaks.

5 Claims, 1 Drawing Sheet

APPARATUS AND METHOD FOR REPAIRING VEHICLE HEATER CORES

BACKGROUND OF THE INVENTION

1. Field of Invention

The present invention relates to devices and methods for repairing leaks in vehicle heater core structures. More particularly, the present invention relates to such devices and methods which do not require removal of the heater core from its attached position within the vehicle.

2. Prior Art

A conventional heating and cooling system in a combustion powered motor vehicle utilizes a heating core as a heat transfer element. This heating core comprises a coiled tube which is coupled into the fluid circulating network of the cooling system of the vehicle. As water/coolant within this cooling system is heated by the combustion engine, a water pump is activated and circulates the water between the radiator and the block of the engine. When the heating system for the vehicle passenger section is activated, the heated fluid is transferred through the heater core, which is usually positioned near the fire wall of the vehicle, considerably removed from the radiator and associated connect lines. The separated relationship of the heater core from the cooling system and its positioning within the vehicle structure create numerous problems upon occurrence of a leak in one or more of the coils of the heater core. Current procedure for repair of such a leak involves introduction of a fluid, sealing compound into the flow line near the radiator and pumping of this solution into the heater core. Ideally, the sealing solution flows through the heater core at the location of the leak, to form a bonded plug which blocks the leak opening. Unfortunately, various forms of deposits and residue accumulate within the heater core which may inhibit effective sealing by the stop-leak compound. Efforts to flush out this residue are often not effective because the heater core is so far removed from entry of the flush solution that effective turbulent action is lost and scaling off of the protective residue coating is minimal.

If repair requires a thorough flushing and effective application of a leak sealing compound, removal of the heater core from the vehicle is typically required with direct flushing and treatment by a fluid pumping system. This service involves considerable expense, primarily because of the substantial labor required to access the heater core and remove it from its "buried" location within the vehicle structure. In fact, general consensus favors replacement of the heater core with a new heater core rather than repair in view of the referenced high cost of labor.

Therefore, a vehicle owner who is faced with the problem of a leaking heater core has only two effective options. First, the owner can attempt to cure the leakage by pumping sealant compound through the coolant system by accessing tubing coupled near the radiator. This not only poses the difficulty of getting the sealing compound through the coolant system to the heater core in sufficient concentration, but also exposes the water pump and other areas within the coolant fluid circuit to possible detrimental effects of the sealing compound. The effectiveness of such repair has already been placed in question in view of the difficulty of developing an effective flush technique for reaching the heater core to expose core material to sealing action of the compound.

The remaining option is to incur the high expense of removing the heater core so that direct repair can be effectively made. At this point of considerable expense, most repairmen would advise replacement of the core with a new core element because of likelihood of occurrence of new leak locations, with the renewed requirement of heavy labor expense to again pull the heater core element from its difficult location.

Accordingly, what is needed is a method or apparatus for enabling effective and inexpensive repair of the heater core without the need of removing the structure from its location within the vehicle.

OBJECTS AND SUMMARY OF THE INVENTION

It is an object of the present invention to provide an apparatus and method for enabling an effective flush and cleansing operation of the heater core interior, as well as applying sealant compound in an effective manner.

It is a further object of the present invention to provide an apparatus and method for repairing a heater core without removal from its vehicle in a manner which reduces labor cost and material expense.

A still further object of this invention is to provide a method and apparatus for repairing a heater core which facilitates convenient use with respect to vehicles of differing manufacture.

These and other objects are realized in a device disclosed herein which comprises an airtight container having a container volume capable of holding liquid coolant and sealing compound wherein the container includes an inlet port for receiving fluid from the heater core and an outlet port for delivering fluid from the container to the heater core. An immersible pump is positioned within the container. This pump operates to take fluid at its intake opening from within the container and deliver it to an outlet opening which is coupled to the outlet port of the container for return to the heater core. An intake connector line is coupled at one end to the inlet port of the container, with the remaining end being coupled in line with a fluid entry point to the heater core. An output connector line is attached at one end to the outlet port of the container, with the remaining end being attached to the remaining fluid access point of the heater core. This creates a closed fluid circuit between the container and heater core which has been retained at its vehicle mounted location. Means are provided in the container for pressurizing fluid within the circuit during operation of the apparatus. An access opening is also provided for introducing sealant compound into the container for circulation through the closed circuit into the heater core. The apparatus may also include a submersible heater element to enhance cleaning and sealant operation within the fluid circuit.

Also disclosed is a method for using this apparatus as part of a repair technique on heater core structures which comprises the following steps. First, the heater core is isolated from its coolant flow circuit with the vehicle radiator system by clamping input and output lines from the heater core to block fluid movement therefrom. Input and output flow lines from the heater core are then cut beyond the clamp portion to provide access to the heater core through exposed flowline openings. Flow connector lines from the airtight container are then attached at these exposed heat core flowline openings to form the referenced closed flow circuit between the container and the heater core. Leak sealant compound is introduced into the container and may be heated and pressurized to more effectively perform its sealing function. In addition, a prior cleansing flush can be performed using the same pumping hardware and closed circuit with heating element to raise the temperature of the cleaning solution. Upon completion of the sealant application, the system is flushed and the heater core flowlines are reconnected to the cooling system of the vehicle.

Utilizing this method and apparatus enables direct access to the heater core without its removal from the vehicle. This saves substantial cost in labor, as well as enhancing the effectiveness of the repair services.

Other objects and features of the present invention will be apparent to those skilled in the art in view of the following detailed description, taken in combination with the accompanying drawings.

DETAILED DESCRIPTION OF THE DRAWINGS

DETAILED DESCRIPTION OF THE INVENTION

Figure 1:
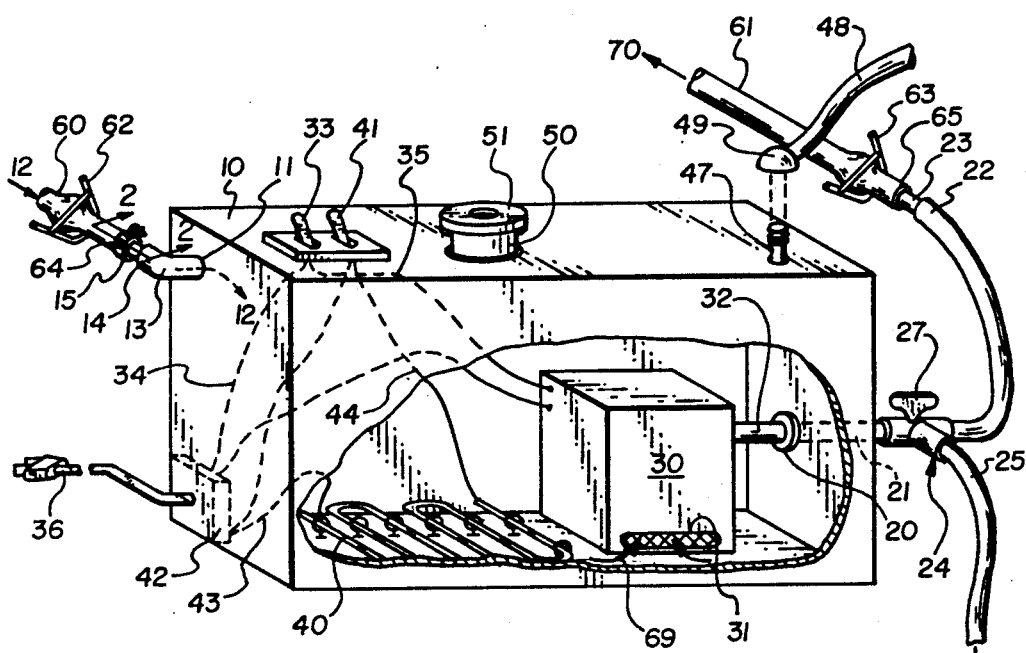
FIG. 1 shows a perspective, cutaway view of an apparatus constructed in accordance with the principles of the present invention.
Figure 2:
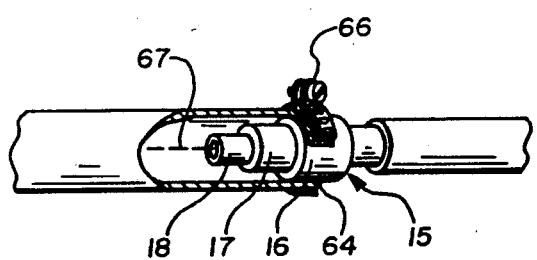
FIG. 2 shows a coupling element illustrated in partial cutaway view, taken along the lines 2—2 of FIG. 1.

Referring now to the drawings:

FIG. 1 discloses an apparatus which is adapted for flushing and repairing a leak in a vehicle heater core without requiring its removal from its vehicle mounted position. This apparatus includes an airtight container 10 which has an interior container volume capable of holding liquid coolant and/or sealing compound in solution. The introduction of such coolant material and sealing compound is discussed hereafter in connection with the method of use. The container includes an inlet port 11 for receiving fluid 12 from the heater core and within the container volume. This inlet port 11 is coupled to an intake connector line 13 which is joined at its remaining end 14 with a coupler tube 15 (shown in greater detail in FIG. 2). The construction of this coupler tube 15 with its multiple diameter sizes 16, 17 and 18 will be discussed hereafter in connection with use directly with differing hose sizes of vehicles of various manufacture.

An outlet port 20 is also provided in the container 10 for delivering fluid from the container to the heater core through an output connector line 21 attached at the outlet port 20. A two-way valve 24 is coupled inline with the connector line 21 and provides selectable output flowlines 22 and 25. Where as line 22 provides a return path for fluid to the heater core, line 25 is a flush line to discard fluid 26 in accordance with procedures which are outlined hereafter. This valve 24 includes a control lever 27 which can be selectively adjusted to alternate fluid flow between the respective flowlines 22 and 25.

Fluid transfer is controlled by an immersible pump 30 which is positioned within the container volume. Fluid flow occurs through an intake opening 31 and an outlet line 32 which connects in line with the outlet port 20. An acceptable pumping device for use in accordance with this invention is a conventional 12-volt hermetically sealed pump. The pump is activated by toggle switch 33 which couples the pump through wires 34 and 35 to the grounded outlet plug 36.

A submersible heater element 40 is secured within the volume of the container 10 and is powered by a second toggle switch 41 which couples into control circuitry 42 and thence through wires 43 and 44 to the actual heater element 40. This circuitry draws electrical power from the same external power source used for the pump 30 via plug 36. Various heater core elements may be used for this application; however, they should at least have the capacity of generating sufficient resistive heat to raise the temperature of contained fluid to at least 150 degrees F., and more typically 180 degrees F. A suitable heater element for this application is a conventional liquid immersion heater.

This airtight container is also adapted with a air pressure feed line 47 with valve stem to enable use with a conventional air hose 48 with a charging head 49 for engaging the pressure valve 47 in a manner similar to that which is used to inflate vehicle tires. The function of increasing air pressure within the sealed container 10 will be more apparent from discussion relating to pressurizing the fluid circuit to enhance sealant action within the heat core.

Additional fluids such as sealant compound and cleaning solution may be added to the container volume through an opening 50 positioned at the top of the container. A pressure cap 51 similar to a conventional radiator cap may be engaged at the opening 50 to retain pressure within safety limits within the container. This cap 51 also operates as a safety valve in the event that pressure from the air hose 48 exceeds preset levels.

The method of repair enabled by the disclosed apparatus is more specifically represented in the following steps. Initially, the heater element mounted within the vehicle must be isolated from fluid flow with the remaining parts of the cooling system. This may be accomplished by clamping hose extensions which couple to the two inlets supplying fluid to the heater core. Although the actual heater core has not been disclosed in the drawings, the hose elements are represented by items 60 and 61. Extensions of these respective hoses 60 and 61 would be connected at the respective inlets to the heater core. In their normal configuration, these hose lines 60 and 61 would form part of the fluid circuit carrying coolant to and from the heater core from the remaining portions of the cooling system.

FIG. 1 shows clamps 62 and 63 applied to the respective hoses 60 and 61 to block fluid flow with respect to the heater core. Such flow isolation of the heater core is necessary in view of the second step of this procedure which involves cutting these respective flowlines 60 and 61 to form flowline openings 64 and 65. To prevent coolant from leaking out of the radiator/coolant system, similar clamps are applied prior to cutting the referenced flowlines 60 and 61. Accordingly, the flowline cuts are applied between each pair of clamps to effectively seal off the cut ends which isolate the heater core from the remaining portion of the cooling system. Obviously, if fluid loss within the heater core is not of concern, clamps 62 and 63 may be deleted from this procedure.

The next step to set up the present apparatus involves establishing a closed fluid circuit between the sealed container 10 and heater core through its respective flowlines 60 and 61. This is accomplished by use of the coupling tubes 15 and 23 which remain affixed to the respective connector lines 13 and 22.

The particular coupler tube includes a step-up diameter configuration represented by consecutively larger diameters shown as 18, 17, and 16. This structure enables versatile use with differing hose sizes as may be encountered on different vehicles. For example, smaller cars having lesser flow rates may be adapted with smaller diameter tubing which would fit tightly over diameter size 18, at the and of the coupler tube 15. This smaller diameter 18 might be ½ inch O.D. The intermediate tube diameter 17 could be dimensioned at ⅝ inch O.D., with the largest diameter 16 being approximately ¾ inch. A tube clamp 66 is positioned around the contacting diameter and secured to prevent inadvertent release of the heater core flowlines 60 and 61 from the attached flowlines 13 and 21 of the present inventive apparatus. The coaxial orientation of the respective tube diameters 18, 17 and 16 around a common tube axis 67 facilitates attachment of most flowline hoses on the coupler tube by simply inserting the hose end over the coupler until it develops a snug fit. The convenience of having such coupling means attached directly to the present apparatus is particularly suited to commercial businesses who may service many different vehicles within a single day period. This feature avoids the need of constant sizing of hose couplings which might thereby encumber an otherwise streamlined process of heater core repair.

Once the apparatus is coupled on line with the respective flowlines of 60 and 61 on the heater core, clamps 62 and 63 may be removed. The container 10 is then filled with fresh water which is pumped through the heater core by means of immersible pump 30. The illustrated flow shows incoming fluid 12 forced from the heater core by pump fluid 69 drawn into the pump 30 and forced through the flowline toward the heater core as illustrated by arrow 70. By adjusting the valve lever 27 to the water entrained within the heater core can then be flushed as indicated at arrow 26 and discarded. This procedure can be repeated as often as necessary.

The container is then filled with a cleanser solution through opening 50. For enhanced cleaning action, the immersible heater element 40 can be activated by the use of toggle switch 41. As the heater element raises the temperature of the cleaning solution, slime and other residual matter retained at the interior surfaces of the heater core is cleared and subsequently flushed free by the same procedures as previously outlined. Following use of the cleanser solution, a final flush with clean water may be applied, in preparation for sealing any leaks within the core coils.

The sealing step is accomplished by introducing sealant compound through opening 50 into the container and by heating such solution to at least 150 degrees, and preferably 180 degrees F. Such sealer compounds are well known and are applied for sealing radiator, as well as heating heater cores. In order to enhance flow of the sealant compound through any possible leaks within the heater core, the closed fluid circuit is pressurized. This is accomplished by applying air pressure through air hose 48 at air valve 47. The sealant solution is then pumped through the core with the applied pressure until leakage is believed to have been stopped. This condition can be confirmed by checking air pressure within the closed line. Any drop in air pressure would be indicative of a retained leak, requiring further sealing compound. Once the air pressure is maintained within the closed system, the sealing solution is flushed free, with clean water then being pumped through the system to clean the heater core prior to removal of the inventive apparatus.

Once the operation has been completed, the respective coupler tubes 15 and 23 are removed from the hose flowline 60 and 61. These hoses 60 and 61 are then reattached to the cut locations within the coolant system. This attachment can be simply accomplished utilizing a small sleeve dimensioned to fit tightly within each end of the joining hoses. Remaining clamps are then removed from the engine side of the coolant system, placing the heater core on line in its repaired condition.

The advantage of applying the present inventive apparatus and method to repair a heater core will now be apparent, based on the foregoing description of prior art techniques. Specifically, the principle advantage is the elimination of extensive labor costs which would otherwise be required if the heater core was removed from its mounted position in the vehicle. The present system allows access to the heater core in most vehicles by accessing interconnecting hoses located near the top of the engine compartment. These hoses are easily accessible and allow the apparatus to be positioned in a convenient location under the hood while running the process in accordance with the predefined steps. In addition, utilizing the present apparatus and method does not require the vehicle engine to be running, because it does not rely on the water pump or other circulating system typically applied when the flushing and sealing operations are introduced through the coolant fluid circuit. Finally, the present invention allows direct access to the heater core with the advantages of improved flushing, cleaning and sealing contact without intervening components such as radiator, engine block, etc. which impede fluid flow to the heater core.

It will be apparent from those skilled in the art that the foregoing examples are merely illustrative of the inventive principles identified herein. Accordingly, these examples are not to be construed as limiting, except as provided under the following claims.

I claim:

1. An apparatus for repairing a leak in a vehicle heater core having fluid coupling lines, without requiring its removal from its vehicle mounted position, said apparatus comprising:

an air-tight container having a container volume capable of selectively holding liquid coolant and sealing compound, said container including (i) an inlet port for receiving fluid from the heater core and (ii) an outlet port for delivering fluid from the container to the heater core;

an immersible pump positioned within the container, said pump having a fluid intake opening and an outlet opening, said outlet opening being coupled to the outlet port of the container, said pump including a power source and switch means for turning the pump on and off;

an intake connector line having one end coupled to the inlet port of the container, the remaining end including means for coupling in line with an unconnected end of one of the fluid coupling lines of the heater core;

an output connector line having one end coupled to the outlet port of the container, the remaining end including means for coupling in line with an unconnected end of one of the fluid coupling lines of the heater core;

an output connector line having one end coupled to the outlet port of the container, the remaining end including means for coupling in line with an unconnected end of a second fluid coupling line of the heater core;

means for pressurizing the container volume and contained fluid lines during operation of the apparatus, the means for pressurizing comprising a valve stem mounted in the container wall and configured for charging with a tire inflation device; and means for introducing sealant compound into the container volume, said introducing means being sealable against fluid flow therethrough during pressurized operation of the apparatus.

2. An apparatus as defined in claim 1, further comprising a submersible heater element secured within the volume of the container and operable to heat contained fluid to a temperature of at least 150 degrees, said heater element including a power source and switch means coupled to an exterior portion of the container to enable activation of the heater element.

3. An apparatus as defined in claim 1, further comprising a two-way valve coupled in line with the output connecter line for selectively defining a first fluid path through the connecter line to the heater core and a second fluid path for disposing of fluid to be flushed from the heater core.

4. An apparatus as defined in claim 1, further comprising step-up coupler tubes attached at the ends of the intake and output connecter lines adapting said lines for attachment to at least two differing inner diameter size of fluid coupling line extending from the heater core, said coupler including a coupler tube diameter at one end dimensioned to fit snugly within the connecter line, the remaining end of the coupler having multiple diameter sizes coaxially configured around the axis of the tube with increasing diameter lengths commencing at a distal end of the coupler and progressing toward an intermediate section.

5. An apparatus as defined in claim 1, wherein the means for introducing sealant compound into the container comprises a container opening positioned in a top wall of the container and configured for engaging a radiator pressure cap to seal the opening during pressurization.

* * * * *